United States Patent
Masada et al.

(10) Patent No.: US 7,332,220 B2
(45) Date of Patent: *Feb. 19, 2008

(54) IRON NITRIDE MAGNETIC POWDER AND METHOD OF PRODUCING THE POWDER

(75) Inventors: Kenji Masada, Okayama (JP); Takafumi Amino, Okayama (JP); Akira Nagatomi, Okayama (JP)

(73) Assignee: Dowa Mining Co., Ltd., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 11/064,939

(22) Filed: Feb. 25, 2005

(65) Prior Publication Data

US 2005/0208320 A1 Sep. 22, 2005

(30) Foreign Application Priority Data

Mar. 17, 2004 (JP) ............................. 2004-076080

(51) Int. Cl.
*B32B 5/16* (2006.01)
(52) U.S. Cl. ....................................... 428/402; 420/128
(58) Field of Classification Search ................ 428/402; 420/128

See application file for complete search history.

(56) References Cited

U.S. PATENT DOCUMENTS 6,964,811 B2 * 11/2005 Kishimoto et al. ......... 428/402

FOREIGN PATENT DOCUMENTS

| JP | 2000-277311 | 10/2000 |
| WO | WO 03/079333 A1 | 9/2003 |

* cited by examiner

*Primary Examiner*—H. T Le
(74) *Attorney, Agent, or Firm*—Clark & Brody

(57) ABSTRACT

An iron nitride magnetic powder consisting primarily of $Fe_{16}N_2$ phase whose average particle diameter determined by particle size measurement using a TEM micrograph is 20 nm or less and whose geometric standard deviation of the particle diameter is 1.4 or less. The iron nitride magnetic powder can be obtained by a method of producing an iron nitride magnetic powder consisting primarily of $Fe_{16}N_2$ phase includes a step of, at the time of producing an iron nitride magnetic powder consisting primarily of $Fe_{16}N_2$ phase by subjecting a reduced powder obtained by reduction of iron oxide to ammonia treatment, using goethite containing Al in solid solution as the iron oxide.

7 Claims, 3 Drawing Sheets

IRON NITRIDE MAGNETIC POWDER AND METHOD OF PRODUCING THE POWDER

BACKGROUND OF THE INVENTION

1. Field of the Invention

This invention relates to an iron nitride magnetic powder for use in a high recording density magnetic recording medium and a method of producing the powder.

2. Background Art

In order to achieve the increasingly higher recording density required by today's magnetic recording media, efforts are being made to enable use of shorter recording wavelengths. For this, it is necessary to make the magnetic particle size much smaller than the length of the region for recording the short-wavelength signal. If it is not, a distinct magnetic transition cannot be produced, making practical recording impossible. The particle size of the magnetic powder is therefore required to be sufficiently smaller than the recording wavelength.

To realize higher recording density, the resolving power of the recording signal must be increased. Reduction of magnetic recording medium noise is therefore important. Noise is largely attributable to particle size. The finer the particles, the lower the noise becomes. This also makes it necessary for a magnetic powder used for high density recording to have sufficiently small particle size.

As the particles become finer, however, it becomes increasingly difficult for them to exist independently of each other. Even in the case of the metal magnetic powders widely used in data storage media, extreme particle refinement undesirably makes the powder susceptible to sintering during the reduction phase of the production process. When sintering occurs, the volume of the particles increases. They therefore become a source of noise and also adversely affect tape-making such as by degrading dispersibility and causing loss of surface smoothness. A magnetic powder suitable for a high-density recording medium requires good magnetic properties as a magnetic material but even more important are the powder properties it exhibits during tape-making, i.e., its particle size, particle size distribution, specific surface area, tap density, dispersibility and the like.

As taught by JP2000-277311A (Ref. No. 1) and WO2003/079333A1 (Ref. No. 2), it is known that an iron nitride system magnetic powder whose main phase is $Fe_{16}N_2$ has excellent magnetic properties that make it suitable for a high-density recording medium. For example, Ref No. 1 describes an iron nitride magnetic material of large specific surface area that exhibits high coercive force (Hc) and high saturation magnetization ($\sigma s$), and teaches that excellent magnetic properties can be achieved irrespective of shape owing to a synergistic effect between the magnetic anisotropy of an $Fe_{16}N_2$ phase and powder specific surface area enlargement. As improvements on the magnetic powder of Ref. No. 1, Ref. No. 2 proposes rare earth element-iron-boron system, rare earth element-iron system and rare earth element-iron nitride system magnetic powders composed of substantially spherical particles or ellipsoid particles and states that a tape medium produced using such a powder has excellent properties, that, in particular, the rare earth element-iron nitride system magnetic powder whose main phase is $Fe_{16}N_2$ exhibits a high coercive force of 2,500 (Oe) despite being composed of fine particles of about 20 nm diameter, high saturation magnetization owing to small BET specific surface area and also good storage stability, and that use of this rare earth element-iron nitride system magnetic powder enables a dramatic increase in the recording density of a coating-type magnetic recording medium. Ref. No. 2 further describes particles of a size level under 20 nm diameter, namely, of 17 nm diameter, having excellent magnetic properties.

This rare earth element-iron nitride system magnetic powder is produced by ammonia nitriding in which rare earth element-iron system magnetic powder obtained by reducing magnetite particles having rare earth elements and one or two of Al or Si adhered to the surface thereof is nitrided using $NH_3$ gas. Owing to the large crystal magnetic anisotropy of the $Fe_{16}N_2$ phase produced by this nitriding, there can be obtained a magnetic powder suitable for a high recording density medium, i.e., a magnetic powder characterized by, for example, fine particle size, high Hc and high $\sigma s$.

As pointed out in Ref. No. 1 and Ref. No. 2, this magnetic powder containing $Fe_{16}N_2$ phase that is small in average particle diameter and excellent in magnetic properties exhibits its high potential as a magnetic material. However, these references are silent regarding its particle size distribution, dispersibility and other powder properties. This makes it difficult to judge whether the magnetic powder is suitable for the coating-type magnetic recording medium in which it is used. Even a magnetic powder excellent in magnetic properties is difficult to use in a coating-type magnetic recording medium if, for example, it is poor in surface smoothness.

Ref. No. 2 relates to generation of $Fe_{16}N_2$ phase having large crystal magnetic anisotropy in which fine particles that do not sinter are produced by adhering Si, Al, rare earth element(s) (defined as including Y) or the like to the particle surfaces as a sinter preventing agent. However, this sinter preventing method utilizing adhesion has a problem in that the particle size distribution of the obtained powder is poor when the adhesion conditions are inadequate because the difference in the degree of sinter preventing agent adhesion among the particles enables sinter prevention where adherence is good but allows sintering to occur where little sinter preventing agent is adhered. The problem is particularly severe in the case of fine particles because the particles tend to cohere and behave like aggregates, thereby aggravating unevenness of the adherence. Poor particle size distribution degrades the tape surface properties and, by extension, degrades the electromagnetic conversion characteristics of the tape.

Even if it should be possible to distribute the particles uniformly without coherence, the sinter prevention method relying on adhesion would still have the disadvantage that the amount of sinter preventing agent required for achieving total surface coating increases as the specific surface area of the particles increases with higher refinement. This leads to the problem of an increase in nonmagnetic components that reduces magnetization per unit quantity. In addition, when Si is used as a sinter preventing agent, although excellent sinter prevention effect can be achieved owing to the strong adsorption of Si, dispersion of the particles is undesirably inhibited by the strong self-bonding of the Si.

SUMMARY OF THE INVENTION

An object of the present invention is to overcome the aforesaid problems by providing an iron nitride magnetic powder consisting substantially of $Fe_{16}N_2$ phase that possesses excellent magnetic properties suitable for a high-recording density magnetic medium, has a narrow particle size distribution, consists of sinter-resistant fine particles of an average particle diameter of 20 nm or less, and exhibits good dispersibility at the time of tape-making.

The inventors discovered that in the production of an iron nitride magnetic powder consisting primarily of $Fe_{16}N_2$ phase by subjecting a reduced powder obtained by reduction of iron oxide to ammonia treatment, it is possible by using goethite containing Al in solid solution as the iron oxide to produce the desired iron nitride magnetic powder consisting primarily of $Fe_{16}N_2$ phase. Specifically, it was found that when goethite containing Al in solid solution at 0.1 to 30 at. % as expressed in Al/Fe ratio by atomic percent is used as the iron oxide, there can be obtained an iron nitride magnetic powder consisting substantially of $Fe_{16}N_2$ phase that has a narrow particle size distribution, consists of sinter-resistant fine particles of an average particle diameter of not greater than 20 nm, and exhibits good dispersibility at the time of tape-making.

The present invention therefore provides an iron nitride magnetic powder consisting primarily of $Fe_{16}N_2$ phase that contains Al at 0.1 to 30 at. % (Al/Fe expressed in atomic percent) and consists substantially of spherical particles or ellipsoid particles of an average axial ratio of between 1 and 2, which iron nitride magnetic powder consists primarily of $Fe_{16}N_2$ phase whose average particle diameter determined by particle size measurement using a TEM micrograph is 20 nm or less and whose geometric standard deviation of the particle diameter is 1.4 or less. The iron nitride magnetic powder according to the present invention has a sedimentation rate of 5 cm/5 hr or less when 3 g of the powder is dispersed in 500 mL of toluene.

This iron nitride magnetic powder can be produced by a production method wherein, at the time of producing an iron nitride magnetic powder consisting primarily of $Fe_{16}N_2$ phase by subjecting a reduced powder obtained by reduction of iron oxide to ammonia treatment, using goethite containing Al in solid solution as the iron oxide. The goethite containing Al in solid solution can be one having a sinter preventing agent such as Al, rare earth element(s) (defined as including Y) or the like adhered to the powder particle surfaces.

The iron nitride magnetic powder of the present invention has a narrow particle size distribution despite consisting of very fine particles. Moreover, it is a magnetic powder consisting primarily of $Fe_{16}N_2$ phase that exhibits excellent dispersibility, so that by utilizing it in the magnetic layer of a coating-type magnetic recording medium it becomes possible to enhance the recording density of the magnetic recording medium to a high level. It is therefore capable making a major contribution to the enhancement of data storage capacity in response to expected increases in the volume of data requiring backup.

DESCRIPTION OF THE PREFERRED EMBODIMENTS

Figure 1:
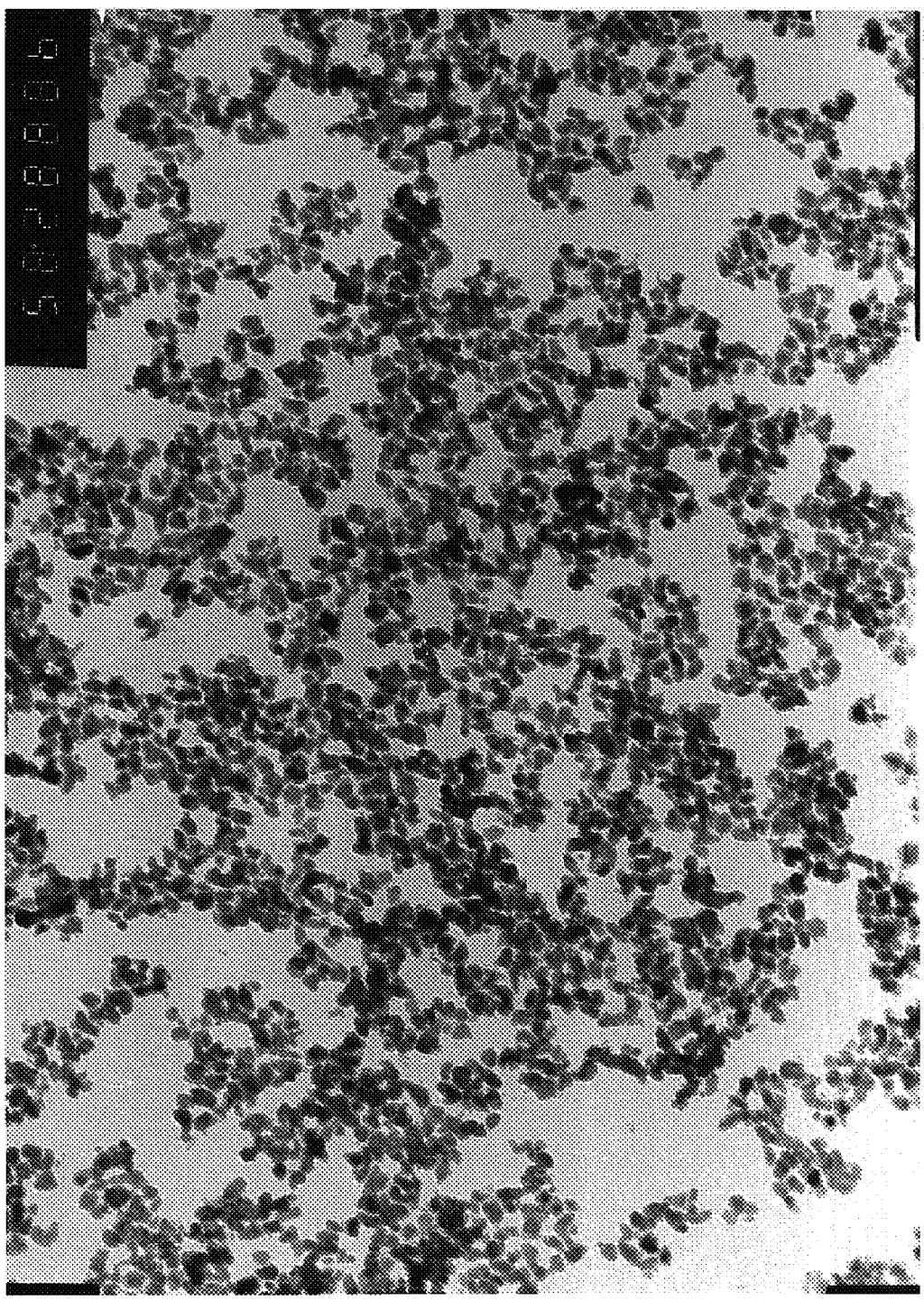
FIG. 1 is a TEM micrograph of an iron nitride magnetic powder according to the present invention, which can be seen to have a narrow particle size distribution and excellent particle dispersibility.

The iron nitride magnetic powder according to the present invention is a magnetic powder consisting primarily of $Fe_{16}N_2$ phase that is produced using iron oxide (goethite) containing Al in solid solution as a starting powder that is first reduced and then treated with ammonia (nitrided with an $NH_3$-containing gas). When fine iron oxide containing Al in solid solution is used as the starting powder, the presence in the particles of Al, which is a sinter preventing agent, inhibits sintering during reduction and nitriding even when the particles are fine, so that there can be obtained a magnetic powder that has a narrow particle size distribution and consists of particles of an average particle diameter of 20 nm or less that are excellent in dispersibility. In contrast, when an Al-containing goethite whose Al content is present only as adhered to the particle surfaces is used as a starting powder, it may be impossible to realize the same good results as when the Al is contained in solid solution. This is clear from Comparative Example 1 explained later.

Thus there can be obtained an iron nitride magnetic powder with a very narrow particle size distribution that consists substantially of spherical particles or ellipsoid particles of an average axial ratio of between 1 and 2. As a result, the geometric standard deviation of the particles determined by particle size measurement using a TEM micrograph is 1.4 or less. When the geometric standard deviation is greater than 1.4, the variation in particle size distribution greatly affects tape-making and degrades the C/N ratio of the magnetic tape. For preventing sintering and obtaining a magnetic powder whose magnetic properties are in good balance, the starting powder containing Al in solid solution should have an Al content based on Fe of 0.1 to 30 at. %, preferably of 5.0-15 at. %. The iron nitride magnetic powder of the present invention has a sedimentation rate of 5 cm/5 hr or less when 3 g of the powder is dispersed in 500 mL of toluene and left to stand. A slower sedimentation rate indicates that the powder has better compatibility with hydrophobic solvents and hydrophobic resins and maintains the dispersed state. In other words, when used to make a coating material at the time of tape-making, it exhibits high blendability and ease of dispersion with respect to a coating material that generally exhibits hydrophobicity. In the case of a powder imparted with sinter prevention capability by Si adhesion (adhesion meaning adherence to the particle surfaces rather than presence in solid solution inside the particles), the sedimentation rate becomes, for example, around 15 cm/5 hr, or about three times that when Al is present in solid solution.

In the present invention, the sinter-prevention property of the magnetic powder can be achieved by using a starting powder that contains Al in solid solution. However, this selection of a starting powder that contains Al in solid solution can be combined with adherence on to particle surface of a sinter preventing agent Al, a rare earth element (which may be Y) or the like. Owing to the sinter prevention effect of the Al in solid solution, an iron nitride magnetic powder prevented from sintering and exhibiting good dispersibility can be obtained using a smaller amount of the adhered sinter preventing agent than in the case of attempting sinter prevention by adherence only.

Particulars specified by the present invention will now be explained in detail.

The present invention adopts a method producing an iron nitride magnetic powder consisting primarily of $Fe_{16}N_2$ phase by subjecting a reduced powder obtained by reducing iron oxide to ammonia treatment and is characterized in the point that goethite containing Al in solid solution is used as the iron oxide.

The iron oxide containing Al in solid solution used as the starting powder can be obtained by an ordinary wet method of producing goethite but with Al also present at the time of the goethite producing reaction. For instance, in the method of producing goethite by neutralizing an aqueous solution of a ferrous salt (such as an aqueous solution of $FeSO_4$ or $FeCl_2$) with an alkali hydroxide (aqueous solution of NaOH or KOH), followed by oxidation with air or the like, it suffices to conduct the goethite producing reaction in the presence of a water-soluble Al salt or aluminate. Alternatively, it is possible to use the method of producing goethite by first neutralizing an aqueous solution of ferrous salt with a carbonic alkali and then oxidizing the result using air or the like, with a water soluble Al salt or aluminate made present in the course of the goethite producing reaction. Still another method is to neutralize an aqueous solution of a ferric salt (such as an aqueous solution of $FeCl_3$) with NaOH or the like and carry out the reaction for producing goethite in the presence of a water-soluble Al salt or aluminate.

The goethite containing Al in solid solution in this manner can be used as the starting powder to be reduced. However, the sinter prevention effect can be further enhanced if desired by adhering Al, rare earth element(s) (defined as including Y) or the like to the surface of the goethite with Al in solid solution. In this case, the sinter preventing agent can be adhered to the particle surfaces by, for example, the method of dispersing the goethite-Al solid solution in water, adding an aqueous solution of an Al salt or an aqueous solution of rare earth element(s) (e.g., yttrium nitrate, lanthanum nitrate or the like) and neutralizing the dispersion with an alkali or the method of removing water from the same dispersion by evaporation. Sinter preventing agents other than Al and rare earth elements (defined as including Y) that can be used include Zr, Cr, V, Mn, Mo, W, P, B and the like. The amount of the sinter preventing agent adhered to the particle surfaces is preferably 0.1-10 at. %, more preferably 0.1-5 at. %.

The goethite with Al in solid solution can be used as the starting powder after being passed through filtration and water-washing steps and then dried at a temperature not higher than 200° C. It is also possible to use a starting powder obtained by subjecting this goethite to dehydration under heating at a temperature of 200-600° C. or reduction in a hydrogen atmosphere having a moisture concentration of 5-20% to produce iron oxide particles by modify the properties of the goethite. The iron oxide in this case is not particularly limited by the kind of iron and oxygen compound and can be any of various such compounds including goethite, hematite, maghemite, magnetite and wustite. The average particle diameter of the iron oxide is preferably 35 nm or less. When the diameter of the starting powder particles is greater than 35 nm, the particle diameter of the final iron nitride magnetic powder product also become large. Such a magnetic powder is not suitable for use in a high-recording density magnetic medium because the large volume of the particles makes them inappropriate for short-wavelength recording and also increases noise by degrading surface smoothness at the time of tape-making.

The Al content of the iron oxide is preferably in the range of 0.1-30 at. %, more preferably 5-15 at. % based on Fe. The Al/Fe ratio remains substantially the same right up to the final iron nitride magnetic powder product. Although the σs of the magnetic powder is high at an Al content of under 0.1 at. %, adequate sinter prevention effect cannot be achieved. When the Al content exceeds 30 at. %, the sinter prevention effect is adequate but the particle size distribution is poor and the magnetic properties are degraded because nitriding is inhibited.

Next, the iron oxide with Al in solid solution is subjected to reduction treatment. The dry method using hydrogen ($H_2$) is generally suitable for the reduction treatment, which reduces the iron oxide to α-Fe. The reduction is preferably conducted at a temperature in the range of 300-600° C. A temperature lower than 300° C. is undesirable because the reduction does not proceed thoroughly and the resulting residual oxygen markedly slows the nitriding treatment. A reduction temperature higher than 600° C. is undesirable because inter-particle sintering tends to occur even though the starting powder contains Al in solid solution. Such sintering increasing the average particle diameter and degrades dispersibility.

The ammonia method set out in Ref. 1 can be applied for the nitriding treatment. That is, the iron nitride powder consisting primarily of $Fe_{16}N_2$ phase can be obtained by holding the reduced powder for several hours in a stream of nitrogen-containing gas, typically ammonia gas, at a temperature not higher than 200° C. The oxygen content of the gas used for the nitriding treatment is preferably as low as possible and not more than several ppm.

Following this nitriding treatment, the particle surfaces are preferably gradually oxidized in a mixed gas of nitrogen and oxygen containing about 0.01-2% oxygen so as to enable the iron nitride magnetic powder to be handled stably in the atmosphere.

The foregoing process provides an iron nitride magnetic powder consisting primarily of $Fe_{16}N_2$ phase whose average particle diameter determined by particle size measurement using a TEM micrograph is 20 nm or less and whose geometric standard deviation of the particle diameter is 1.4 or less. The magnetic powder entrains the Al contained in the starting powder and has an Al content, expressed as Al/Fe atomic percent, of 0.1-30 at. %. Since magnetic powder is therefore protected against sintering, it has a narrow particle size distribution and uniform particle size. In addition, it exhibits a sedimentation rate of 5 cm/5 hr or less when 3 g of the powder is dispersed in 500 mL of toluene and, as such, has excellent dispersibility in resin.

EXAMPLES

Although examples of the present invention will be set out below, the testing methods used to assess the property values obtained in the examples will be set out first.

Evaluation of Powder Properties

Particle size measurement: A transmission electron micrograph taken at 30,000 magnifications was enlarged two times in length and width and the longest portions of 400 of the so-obtained particle images were measured separately for each particle and the average value of the measured lengths was calculated.

Measurement of powder magnetic properties: A VSM (vibrating sample magnetometer, product of Digital Measurement Systems) was used to conduct measurement in an externally applied magnetic field of max. 796 KA/m.

Geometric standard deviation: Geometric standard deviation serves to normalize the measured particle size of the powder as that in accordance with the geometric distribution. Specifically, a graph was plotted in which the horizontal axis represented the logarithmic transformation value of the particle size and the vertical axis represented the accumulated number of particles and the standard deviation was calculated in the usual manner.

Specific surface area: Measured by BET method.

Sedimentation rate: Measured for the magnetic powder in toluene under the following conditions. A slurry obtained by mixing 3 g of magnetic powder and 500 mL of toluene was subjected to a minimum of two hours of dispersion treatment by circulation at 500 mL/min in an ultrasonic homogenizer and the dispersion obtained was transferred to a 50 cc test tube and allowed to stand for five hours, whereupon the uppermost level of the sediment was measured. In other words, the distance by which the uppermost level of the sediment descended was measured to determine the distance moved over five hours, that is sedimentation rate the distance/5 hours. A slower sedimentation rate indicates that the powder has better compatibility with hydrophobic solvents and hydrophobic resins, so that the powder particles better maintain their dispersed state in such a solvent or resin.

Composition Analysis

The amounts of Al and rare earth elements (defined as including Y) in the magnetic powder were determined by high-frequency inductively coupled plasma emission spectroscopy (Nippon Jarrell Ash IRIS AP). The amount of Fe was determined using a Hiranuma Automatic Titrater (COMTIME-980, Hiranuna Sangyo KK). The determinations produced results expressed in wt. %. The total element ratios were therefore once converted to at. % and the transformed values were used to calculate Al/Fe (at. %) and Y/Fe (at. %).

Tape Property Evaluation Methods (1) Magnetic Coating Material Preparation

A magnetic coating material was prepared as follows. Magnetic powder, 0.35 g, was weighed out and placed in a pot (inside diameter: 45 mm, depth: 13 mm) and allowed to stand for 10 min. with the cover open. Next, 0.700 mL of a vehicle [mixed solution of vinyl chloride resin MR-110 (22 wt %), cyclohexanone (38.7 wt %), acetylacetone (0.3 wt %), n-butyl stearate (0.3 wt %) and methyl ethyl ketone (MEK, 38.7%)] was added to the pot using a micropipette. 30 g of a steel ball (2ϕ) and ten nylon balls (8ϕ) were immediately added to the pot and the pot was covered and allowed to stand for 10 min. The pot was then set in a centrifugal ball mill (Fritsch P-6) and gradually raised to a final rotating speed of 600 rpm, at which dispersion was continued for 60 min. The centrifugal ball mill was stopped and the pot removed. Using a micropipette, the pot was added with 1.800 mL of a liquid adjuster prepared in advance by mixing MEK and toluene at a ratio of 1:1. The pot was again set in the centrifugal ball mill and rotated at 600 rpm for 5 minutes. This completed the dispersion.

(2) Magnetic Tape Preparation

Upon completion of the foregoing dispersion, the cover of the pot was opened and the nylon balls removed. The coating material, together with the steel ball, was placed in an applicator (55 μm) and coated onto a support film (15 μm polyethylene film marketed by Toray Industries under the product designation 15C-B500). The coated film was promptly placed at the center of the coil of a 5.5 kG magnetic orientation device to orient its magnetic field, and then dried.

(3) Tape Property Evaluation

Magnetic property measurement: Hcx, SFDx and SQx of the obtained tape were measured using a VSM (Digital Measurement Systems) under an externally applied magnetic field of max. 796 kA/m.

Example 1

To 4 L (four liters) of a 0.2 mol/L aqueous solution of $FeSO_4$ were added 0.5 L of a 12 mol/L aqueous solution of NaOH and an amount of sodium aluminate to make Al/Fe=10 at. %. The liquid mixture was maintained at a temperature of 40° C. while air was blown into it at a flow rate of 300 mL/min for a period of 2.5 hours, thereby precipitating goethite containing Al in solid solution. Upon completion of this oxidation treatment, the precipitate was filtered off, washed with water and then dispersed in water.

The dispersion was added with an amount of yttrium nitrate to make Y/Fe=2.0 at. % and then, at 40° C., with an amount of sodium aluminate to make Al/Fe=1.6 at. %, and with NaOH to adjust the pH to 7-8, thereby adhering yttrium and aluminum to the particle surfaces. The result was separated from the liquid by filtering, washed with water and dried in air at 110° C.

The so-obtained starting powder consisted of goethite having an average particle diameter of 30 nm and by composition analysis was found to contain Al and Y at the rates of Al/Fe=9.5 at. % and Y/Fe=1.9 at. %. This powder was, as a starting material, reduced in hydrogen gas at 500° C. for 3 hours. It was then cooled to 100° C., at which temperature the gas was changed from hydrogen to ammonia, and thereafter heated to 140° C. Nitriding was conducted for 48 hours at this temperature. After the nitriding treatment, the temperature was lowered to 80° C. and the gas was changed to nitrogen gas to which was added an amount of air so as to impart an oxygen concentration of 0.01-2 vol. % and subject the surface of the powder to gentle oxidation. The powder was then taken out into the air.

The iron nitride magnetic powder obtained was observed with an electron microscope and found to consist of sinter-free ellipsoid particles of an average particle diameter of 15 nm. A TEM micrograph (×174,000) of the powder is shown in FIG. 1.

The geometric standard deviation of the magnetic powder particles was determined from the measured sizes of the particle images in the TEM micrograph and found to be 1.27. The BET specific surface area of the powder was 72 $m^2/g$. The results of magnetic property evaluation were: Hc=211 kA/m, σs=65 $Am^2/kg$ and σr/σs=0.50. The sedimentation rate of the magnetic powder in toluene was 3 cm/5 hr.

The evaluated properties of a tape fabricated using the powder were: Hcx=230 kA/m, SFDx=0.75 and SQx=0.71. The evaluation results are summarized in Table 1.

Example 2

Example 1 was repeated except that when the precipitated goethite containing Al in solid solution obtained by the oxidation treatment was further subjected to the treatment for adhering sinter preventing agent, a zirconium sulfate was used instead of sodium aluminate so as to make Zr/Fe=3 at. %. The powder properties of the obtained magnetic powder and properties of the tape were evaluated in the manner of Example 1. The results are shown in Table 1.

Comparative Example 1

Figure 2:
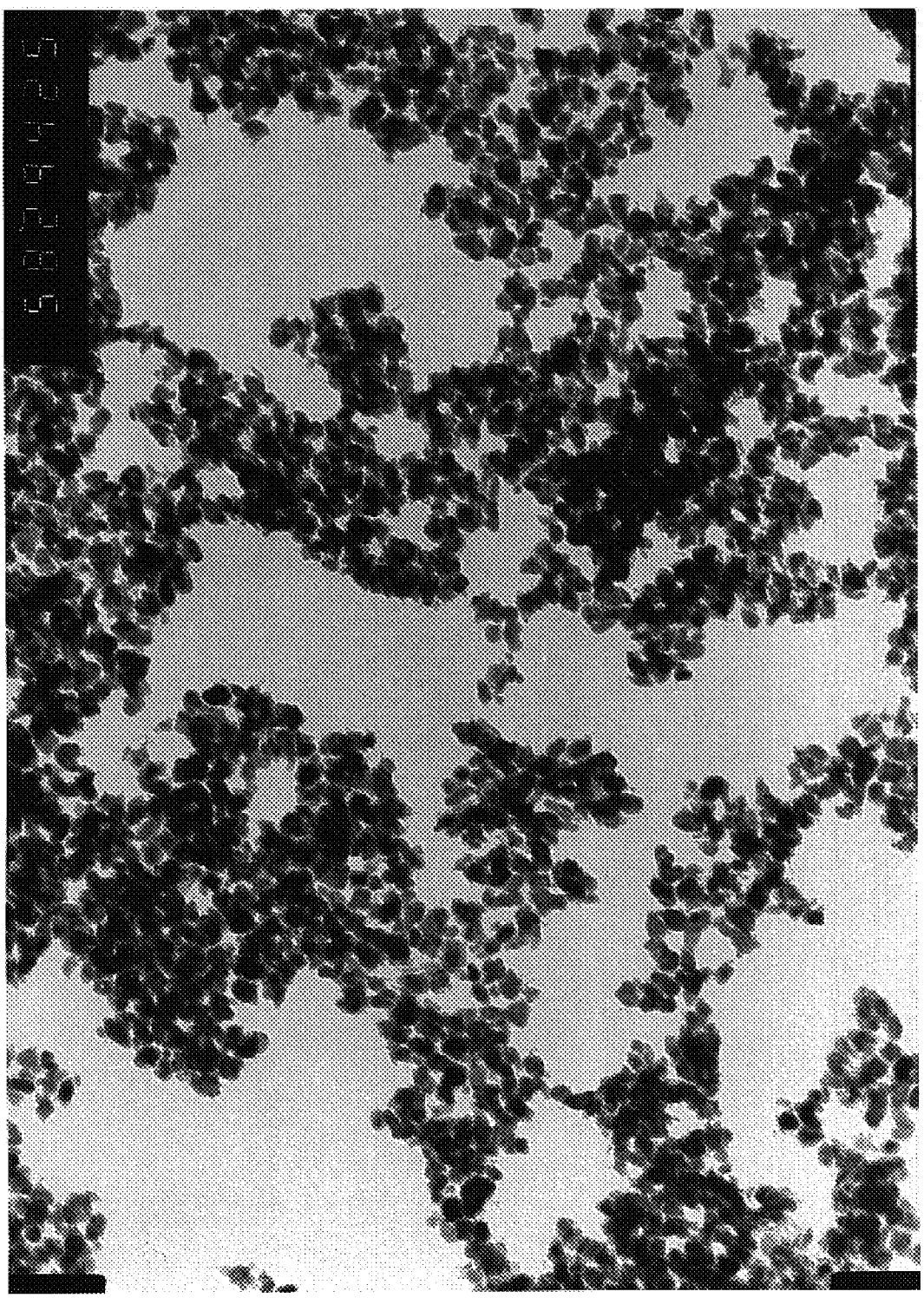
FIG. 2 is a TEM micrograph of an iron nitride magnetic powder according to a comparative example, which can be seen to be more sintered and to have undergone more particle enlargement than the powder of FIG. 1.

Example 1 was repeated except that no sodium aluminate was added before the oxidation treatment, while in the adhering treatment conducted after precipitation of goethite in the oxidation treatment, sodium aluminate was added in the same total amount as in Example 1. A TEM micrograph (×174,000) of the obtained magnetic powder is shown in FIG. 2. The evaluated powder properties and tape properties are shown in Table 1.

Comparative Example 2

Figure 3:
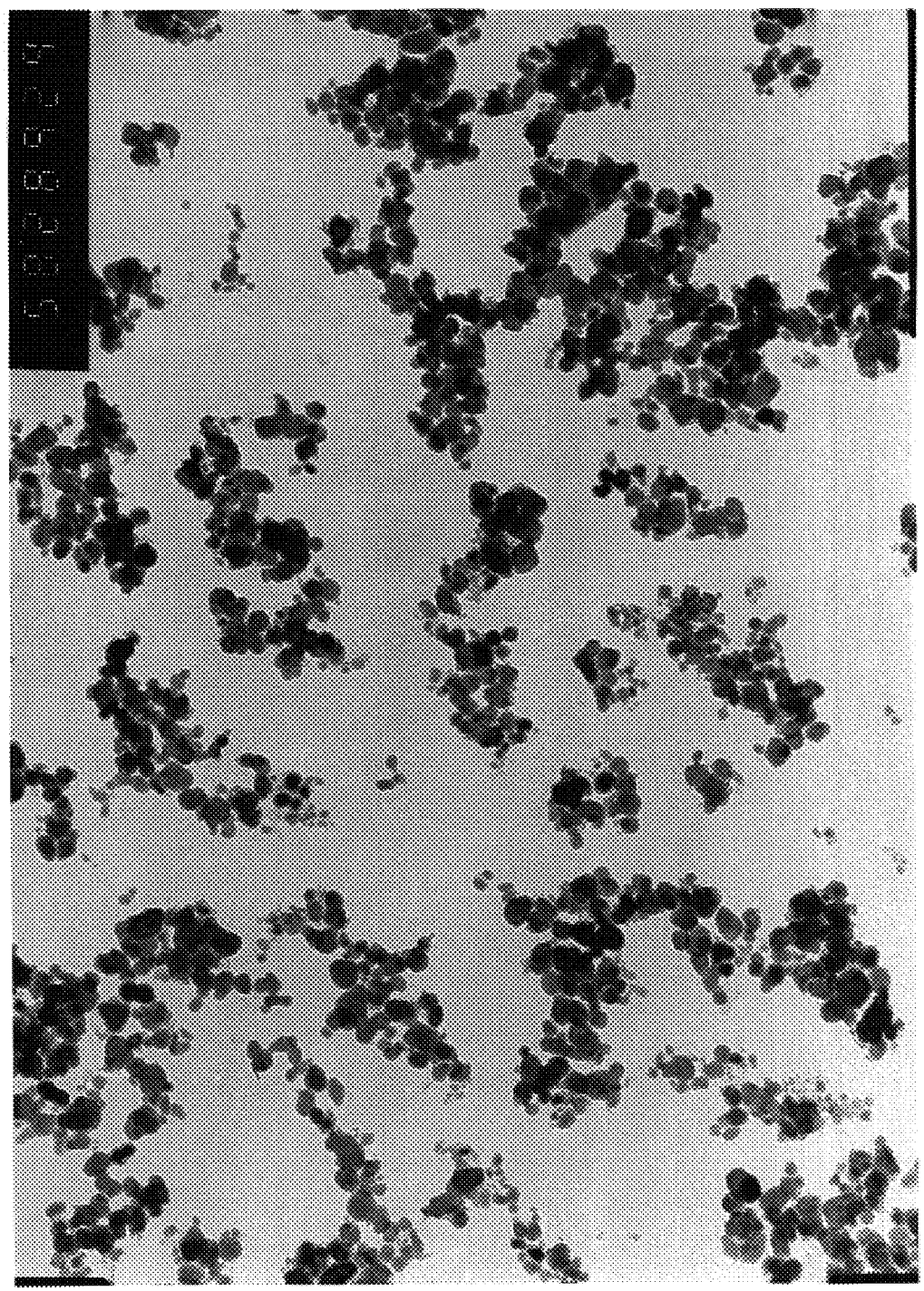
FIG. 3 is a TEM micrograph of an iron nitride magnetic powder according to another comparative example, which can be seen to be more sintered and to have undergone more particle enlargement than the powder of FIG. 1.

Example 1 was repeated except that instead of using goethite powder as the starting powder there was used a magnetite powder of an average particle diameter of 20 nm whose particles surfaces had Al and Y adhered thereto at the rates of Al/Fe=9.7 at. % and Y/Fe=1.0 at. %. A TEM micrograph (×174,000) of the obtained magnetic powder is shown in FIG. 3. The evaluated powder properties and tape properties are shown in Table 1.

Comparative Example 3

Example 1 was repeated except that instead of using goethite powder as the starting powder there was used a magnetite powder of an average particle diameter of 20 nm whose particles surfaces had Si and Y adhered thereto at the rates of Si/Fe=5.0 at. % and Y/Fe=1.0 at. %. The powder properties of the obtained magnetic powder and properties of the tape were evaluated. The results are shown in Table 1.

with FIGS. 2 and 3. Tapes made using the magnetic powders of Examples 1 and 2 were therefore markedly better in tape properties than tapes made using the magnetic powders of the Comparative Examples.

Example 3

The magnetic powder obtained in Example 1 was used to fabricate a magnetic test tape having a double-layer structure composed of a magnetic layer and a nonmagnetic layer. The tape was subjected to magnetic conversion measurement.

In preparing the magnetic coating material, 100 parts by weight of the magnetic powder were blended with the materials set out below in the indicated number of parts by weight. In preparing the nonmagnetic powder, 85 parts by weight of the nonmagnetic powder were blended with the materials set out below in the indicated number of parts by weight. Both blends were kneaded and dispersed using a kneader and a sand grinder.

Magnetic Coating Material Composition

| | |
|---|---|
| Magnetic powder | 100 parts by weight |
| Carbon black | 5 parts by weight |
| Alumina | 3 parts by weight |
| Vinyl chloride resin (MR110) | 15 parts by weight |
| Polyurethane resin (UR8200) | 15 parts by weight |
| Stearic acid | 1 part by weight |
| Acetylacetone | 1 part by weight |
| Methyl ethyl ketone | 190 parts by weight |
| Cyclohexanone | 80 parts by weight |
| Toluene | 110 parts by weight |

TABLE 1

| | | | | Composition analysis | | | | Number average | | Bulk properties | | | | Tape properties | | | Geometric | Sedimentation |
|---|---|---|---|---|---|---|---|---|---|---|---|---|---|---|---|---|---|---|
| | No. | Starting powder | Al adhesion method | Al (at. %) | Y (at. %) | Zr (at. %) | Si (at. %) | particle diameter (nm) | BET (m²/g) | Hc (kA/m) | σs (kA²/kg) | σr/σs | Hcx (kA/m) | SFDx | SQx | SD σg | rate (cm/5 hr) |
| Ex | 1 | Goethite 30 nm | Solid Sol. + Adherence | 9.5 | 1.9 | 0.0 | — | 15 | 72 | 211 | 65 | 0.50 | 230 | 0.75 | 0.71 | 1.27 | 3 |
| Ex | 2 | Goethite 35 nm | Solid Sol. | 9.0 | 1.0 | 2.3 | — | 18 | 68 | 235 | 78 | 0.51 | 255 | 0.65 | 0.73 | 1.34 | 4 |
| C. Ex | 1 | Goethite 30 nm | Adherence | 9.5 | 1.9 | — | — | 32 | 64 | 140 | 75 | 0.40 | 170 | 1.30 | 0.64 | 1.78 | 13 |
| C. Ex | 2 | Magnetite 20 nm | Adherence | 9.7 | 1.0 | — | — | 22 | 45 | 128 | 119 | 0.41 | 152 | 1.65 | 0.63 | 1.69 | 15 |
| C. Ex | 3 | Magnetite 20 nm | — | — | 1.0 | — | 5.0 | 20 | 50 | 175 | 85 | 0.48 | 205 | 1.12 | 0.67 | 1.50 | 25 |

It can be seen from the results shown in Table 1 that the magnetic powders of Examples 1 and 2 that used goethite containing Al in solid solution as the starting powder exhibited geometric standard deviation of 1.4 or less and sedimentation rate of 5 cm/5 hr or less and were superior in sinter prevention to the powders of Comparative Examples 1 and 2 that used goethite and magnetite adhered with Al. As a result, the powders of Examples 1 and 2 had good particle size distribution and excellent dispersibility in resin. That this is in fact true can be seen from a comparison of FIG. 1

Nonmagnetic Coating Material Composition

| | |
|---|---|
| Nonmagnetic powder (α-Fe₂O₃) | 85 parts by weight |
| Carbon black | 20 parts by weight |
| Alumina | 3 parts by weight |
| Vinyl chloride resin (MR110) | 15 parts by weight |
| Polyurethane resin (UR8200) | 15 parts by weight |
| Methyl ethyl ketone | 190 parts by weight |

-continued

| | |
|---|---|
| Cyclohexanone | 80 parts by weight |
| Toluene | 110 parts by weight |

The obtained coating fluid for magnetic layer formation and coating fluid for nonmagnetic layer (underlayer) formation were applied onto a base film composed of an aramid support to obtain the desired underlayer thickness of 2.0 μm and magnetic layer thickness of 0.20 μm. The magnetic layer was oriented while still damp by exposure to a magnetic field, whereafter drying and calendering were conducted to obtain a double-layer structure magnetic tape.

The magnetic properties and the magnetic conversion properties (C/N ratio, output) of the obtained magnetic tape were measured. In C/N ratio measurement, a drum tester was attached to the recording head and a digital signal was recorded at a recording wavelength of 0.35 μm. At this time, an MR head was used to measure the reproduced signal and noise was measured as demodulation noise. In evaluation, the output and C/N ratio in the case of using the magnetic powder of Comparative Example 1 was defined as 0 dB. The results of the evaluations are shown in Table 2.

Example 4

Example 3 was repeated except that the magnetic powder of Example 2 was used. The magnetic properties and electromagnetic conversion characteristics of the obtained magnetic tape are shown in Table 2.

Comparative Examples 4-6

Example 3 was repeated except that the magnetic powders obtained in Comparative Examples 1-3 were used. The magnetic properties and electromagnetic conversion characteristics of the obtained magnetic tapes are shown in Table 2.

TABLE 2

| | Magnetic powder used | Magnetic conversion measurements | | |
|---|---|---|---|---|
| | | Output (dB) | N (dB) | C/N (dB) |
| Example 3 | Example 1 | 1.5 | −2.0 | 3.5 |
| Example 4 | Example 2 | 1.7 | −1.0 | 2.7 |
| Comparative Example 4 | Comparative Example 1 | 0 | 0 | 0 |
| Comparative Example 5 | Comparative Example 2 | −0.7 | −1.1 | 0.4 |
| Comparative Example 6 | Comparative Example 3 | −2.0 | 1.5 | −3.5 |

It can be seen from the results in Table 2 that the magnetic tapes fabricated using the magnetic powders of Examples 1 and 2 were markedly superior to those of Comparative Examples 4-6 in output, noise and C/N ratio.

What is claimed is:

1. An iron nitride magnetic powder consisting primarily of $Fe_{16}N_2$ phase whose average particle diameter determined by particle size measurement using a TEM micrograph is 20 nm or less and whose geometric standard deviation of the particle diameter is 1.4 or less.

2. An iron nitride magnetic powder according to claim 1, which has an Al content, expressed as Al/Fe atomic percent, of 0.1-30 at. %

3. An iron nitride magnetic powder according to claim 2, which consists substantially of spherical particles or ellipsoid particles of an average axial ratio of between 1 and 2.

4. An iron nitride magnetic powder according to claim 2, which has a sedimentation rate of 5 cm/5 hr or less when 3 g of the powder is dispersed in 500 mL of toluene.

5. An iron nitride magnetic powder according to claim 1, which consists substantially of spherical particles or ellipsoid particles of an average axial ratio of between 1 and 2.

6. An iron nitride magnetic powder according to claim 5, which has a sedimentation rate of 5 cm/5 hr or less when 3 g of the powder is dispersed in 500 mL of toluene.

7. An iron nitride magnetic powder according to claim 1, which has a sedimentation rate of 5 cm/5 hr or less when 3 g of the powder is dispersed in 500 mL of toluene.

* * * * *